United States Patent [19]
Palvoelgyi

[11] Patent Number: 5,944,076
[45] Date of Patent: Aug. 31, 1999

[54] ON-BOARD REFUELING VAPOR RECOVERY SYSTEM

[75] Inventor: Sandor Palvoelgyi, Geisdorf, Austria

[73] Assignee: Blau International, Ges.m.b.H., Weiz, Austria

[21] Appl. No.: 09/070,000

[22] Filed: Apr. 30, 1998

Related U.S. Application Data

[60] Provisional application No. 60/044,435, Apr. 30, 1997.

[51] Int. Cl.$^6$ ....................................................... B65B 1/04
[52] U.S. Cl. ......................... 141/348; 141/301; 123/516; 123/519; 220/86.2
[58] Field of Search ...................................... 141/348, 301; 123/516, 518, 519, 520, 521; 220/86.2; 137/588, 589

[56] References Cited

U.S. PATENT DOCUMENTS

| | | |
|---|---|---|
| 4,747,508 | 5/1988 | Sherwood . |
| 4,821,908 | 4/1989 | Yost . |
| 4,869,283 | 9/1989 | Oeffling et al. . |
| 4,924,923 | 5/1990 | Boehmer et al. . |
| 5,054,528 | 10/1991 | Saitoh . |
| 5,056,494 | 10/1991 | Kayanuma ............................... 123/516 |
| 5,235,955 | 8/1993 | Osaki ...................................... 123/516 |
| 5,404,906 | 4/1995 | Aoshima et al. . |
| 5,568,828 | 10/1996 | Harris . |

*Primary Examiner*—Steven O. Douglas
*Attorney, Agent, or Firm*—Pillsbury Madison & Sutro LLP

[57] ABSTRACT

An on-board refueling vapor recovery system for a motor vehicle comprising a fuel tank constructed to store a quantity of liquid fuel. A nozzle-receiving portion has a nozzle-receiving opening fluidly communicated with the fuel tank. Closure structure is constructed to be moved into closing engagement with the nozzle-receiving portion to close the nozzle-receiving opening. An exhaust passage communicates the fuel tank to an atmosphere outside of the motor vehicle to thereby allow fuel vapor to vent from the fuel tank to the atmosphere. The exhaust passage includes a filtration device communicated with the fuel tank to filter environmentally harmful elements from the fuel vapor as it vents from the fuel tank to the atmosphere. A closure structure sensing device is configured to transmit electric signals based on whether the closure structure is in closing engagement with the nozzle-receiving portion. A valve control unit is configured to control whether the valve is opened or closed. The control unit is responsive to the electric signal from the closure sensing device and to a signal from the motor vehicle indicating whether the motor vehicle ignition has been activated.

22 Claims, 1 Drawing Sheet

ON-BOARD REFUELING VAPOR RECOVERY SYSTEM

This application claims the benefit of U.S. Provisional Application No. 60/044,435, filed Apr. 30, 1997.

The present invention relates to an on-board refueling vapor recovery system for a motor vehicle. More particularly, the present invention relates to a vapor recovery system having a control unit which prevents fuel vapors from entering a filtration device under certain conditions.

The use of on-board refueling vapor recovery systems having an exhaust passage through which fuel vapors can be vented to the atmosphere are conventionally known. Typically, these systems utilize a filtration device, such as a carbon canister, to filter out environmentally harmful elements from the fuel vapor as it is passes out to the atmosphere. However, it is undesirable to allow the filtration devices to be in constant communication with the vehicle fuel tank because it will become unnecessarily saturated when its function is not required. Preferably, it is desirable to limit the communication between the fuel tank and the filtration device to those times when the engine is not running and the fuel cap has been removed for refueling in order to optimally utilize the filtration device and preserve its functional life.

Heretofore, it has been known to utilize mechanical devices which open and close the passage between the fuel tank and a storage or filtration device in response to movement of a cap or closure structure into and out of engagement with the end of the fill tube. Examples of such devices are disclosed in U.S. Pat. Nos. 4,689,283, and 4,747,508. It has also been known to use a control valve in order to open and close the passage communicating a vapor inlet passageway to a fuel recovery canister. An example of such a construction is disclosed in U.S. Pat. No. 5,568,828. However, the moving parts and/or additional piping utilized in these constructions add extra cost to the design of system and present problems with respect to packaging. Also, these parts and/or piping may be vulnerable to damage during a collision.

It is also desirable to prevent communication between the fuel tank and the filtration device while the engine is operating regardless of whether the fuel cap is in place in the event the operator fails to replace the cap after refueling. Limiting such communication to those times when the engine is not operating ensures that the filtration device will have a longer functional life by preventing fuel vapor from flowing therein while the vehicle is being driven.

It is therefore an object of the present invention to provide a vapor recovery system which obviates the problems associated with the conventionally known vapor recovery systems and meets the needs described above. The present invention is an on-board refueling vapor recovery system for a motor vehicle. The system comprises a fuel tank constructed and arranged to store a quantity of liquid fuel. A nozzle-receiving portion has a nozzle-receiving opening. The nozzle-receiving portion is fluidly communicated with the fuel tank such that a fuel nozzle can be inserted into the nozzle-receiving opening and supply liquid fuel to the fuel tank. Closure structure is constructed and arranged to be moved into closing engagement with the nozzle-receiving portion to thereby close the nozzle-receiving opening. The closure structure is movable out of closing engagement with the nozzle-receiving portion to thereby allow the fuel nozzle to be inserted into the nozzle-receiving opening. An exhaust passage communicates the fuel tank to an atmosphere outside of the motor vehicle when the exhaust passage is in an opened condition to thereby allow fuel vapor to vent from the fuel tank to the atmosphere. A filtration device is disposed in the exhaust passage and constructed and arranged to filter environmentally harmful elements from the fuel vapor it vents from the fuel tank to the atmosphere. A valve is disposed in the exhaust passage and movable between a closed position to close the exhaust passage and an open position to open the exhaust passage. A closure structure sensing device is positioned and configured to transmit electric signals based on whether the closure structure is disposed in closing engagement with the nozzle-receiving portion. A valve control unit is operatively connected with the valve and constructed and arranged to control whether the valve is opened or closed. The control unit is responsive to the electric signal from the closure sensing device and to a signal from the motor vehicle indicating whether the motor vehicle ignition has been activated. The valve control unit opens the valve to communicate the fuel tank with the filtration device to thereby allow the fuel vapor to be filtered and vented from the fuel tank to the atmosphere through the exhaust passage in response to the signal indicating that the motor vehicle ignition has not been activated in combination with the electrical signal from the closure structure sensing device indicating that the closure structure has been moved out of closing engagement with the nozzle-receiving portion. The valve control unit closes the valve to prevent communication between the fuel tank and the filtration device in response to the signal that the motor vehicle ignition has been activated.

Other objects, features, and characteristics of the present invention, as well as the method of operation and function of the related elements, will become more apparent upon consideration of the following detailed description and appended claims with reference to the accompanying drawing, all of which are a part of this specification.

DETAILED DESCRIPTION OF THE DRAWINGS

Figure 1:
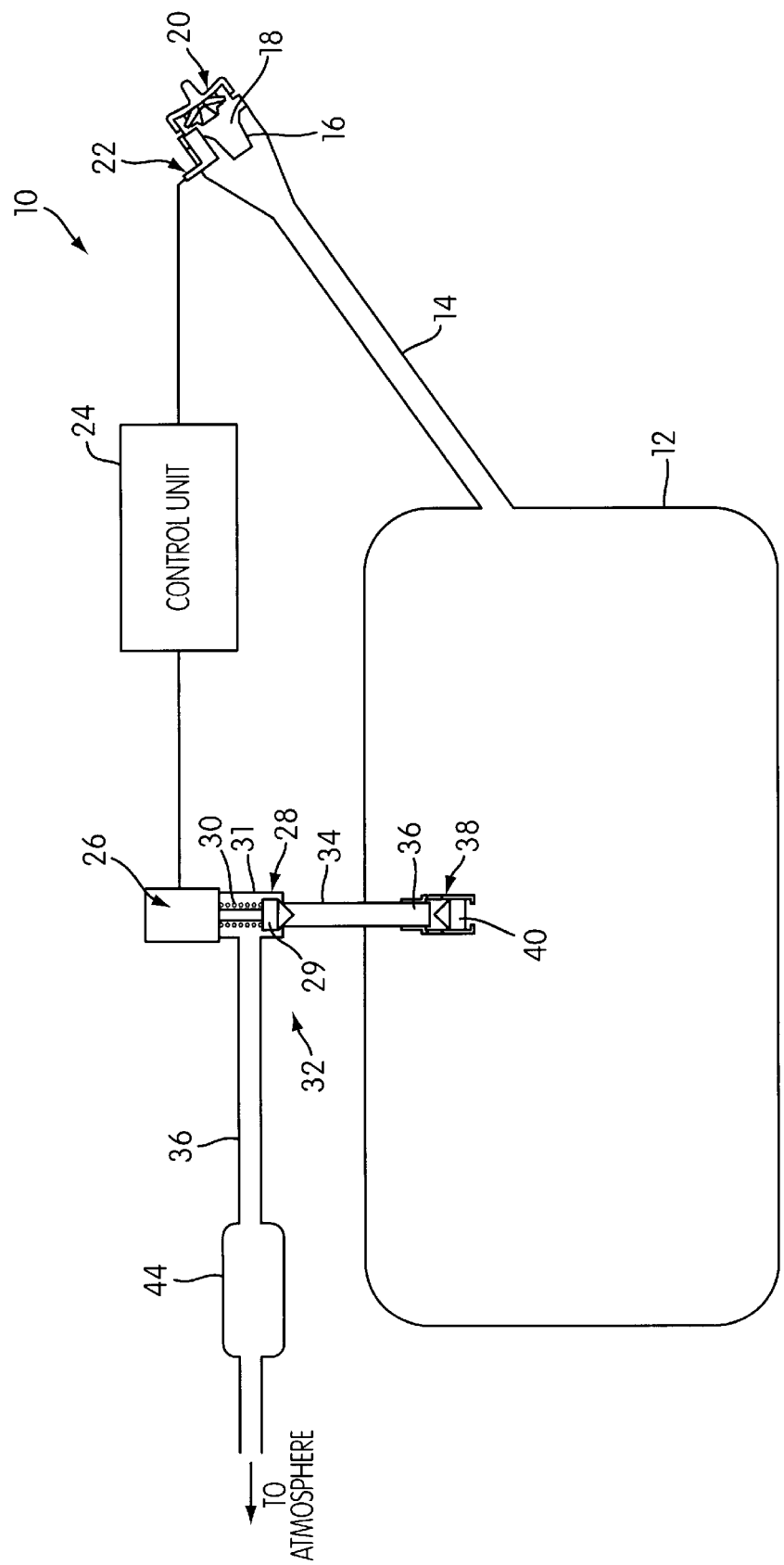
FIG. 1 is a schematic view showing the on-board refueling vapor recovery system in accordance with the principles of the present invention.

The present invention relates to an on-board refueling vapor recovery system for a motor vehicle, generally indicated at 10. The system includes a fuel tank 12, and a fuel fill pipe 14 which enables fluid communication between the fuel tank 12 and a fuel nozzle receiving portion or filler neck 16 defining a nozzle-receiving opening 18 for receiving a fuel nozzle which supplies liquid fuel to the fuel tank 12. A gas cap or filler neck closure structure, generally indicated at 20, is of any known construction and is constructed and arranged to be moved into closing engagement with the nozzle-receiving portion 16 to thereby seal the opening 18 from the external environment.

A closure structure sensing device 22 is mounted with respect to the filler pipe 14 and/or the nozzle receiving portion 16 and is constructed and arranged to detect whether the closure structure 20 has been moved out of engagement with the nozzle-receiving portion 16, or whether it is secured in closing engagement with the nozzle-receiving portion 16. Sensing devices of this type are known in the art. It is contemplated that the closure structure sensing device 22 may function electrically, electromechanically or pneumatically in detecting whether the closure assembly 20 is in place.

The closure structure sensing device 22 sends an electric signal to a control unit 24, which is preferably a microprocessor unit. In addition to receiving the signal from sensor 22, control unit 24 also receives a signal, for example, directly from the ignition, for detecting whether the ignition has been activated to indicate whether the engine of the vehicle is running.

If the control unit 24 determines that the ignition has been activated, and, at the same time, that the closure structure 20 is not in closing engagement with the nozzle-receiving portion 16, the control unit 24 sends a warning indication, for example, in the form of an indication light on the motor vehicle dashboard for alerting the motor vehicle user. The vehicle user may then take the appropriate remedial action, such as replacing a lost closure structure 20.

If the control unit 24 determines that the ignition is off and also that the closure structure 20 has been removed, the control unit 24 sends an electric signal to a valve actuating device 26. The actuating device 26 may be of any conventional type, preferably electromechanical, solenoid, motor operable, or electropneumatic.

Upon receiving the appropriate signal from the control unit 24, the valve actuating device 26 switches an on-board refueling vapor recovery exhaust valve structure, generally indicated at 28, from a closed to an opened condition. The valve structure 28 includes a movable sealing element 29, disposed in a normally closed position within the valve housing 31, for example, by operation of a coil spring 30. The actuating device 26 operates to move the movable valve element 29 against the bias of the spring 30 to open the valve structure 28. It should be appreciated that this described valve structure 28 is merely exemplary of the many various types of valves that can be used for this application which are widely known in the art.

A vapor fume piping system, generally indicated at 32, includes a first pipe 34 which extends into the fuel tank 12 and communicates between the tank 12 and the valve structure 28. Disposed at the end 36 of the first pipe 34 is a float valve 38, which is normally opened to permit fumes to pass thereby from the tank 12 to the valve structure 28. The float valve 38 includes a float member 40 which will be raised once the fuel level becomes sufficiently high to seal the end 36 of pipe 34. The float valve 38 will prevent overfilling in a conventional manner.

The piping system 32 further includes a second pipe 36 which is in communication with the first pipe 34 through the valve structure 28 when it is in an opened condition (i.e., during a filling operating). The second pipe 36 extends from the valve structure 28 to a filtration device in the form of a carbon canister 44 containing a conventional carbon filter. The carbon canister 44 substantially removes the environmentally harmful components from the fuel vapors received from the second pipe 36, so that the exhaust to atmosphere is environmentally friendly.

Because the valve structure 28 is normally in a closed condition, the carbon canister 44 will not be exposed to the fuel vapors while the vehicle is in operation or when the closure structure 20 is in closing engagement with the nozzle-receiving portion 16. As a result, the carbon filter material in canister 44 is preserved, and in particular, prevented from becoming unnecessarily and unduly saturated when its function is not required. When a fueling operation begins and vapor recovery or elimination is required, the control unit 24 detects that the ignition is off and the closure structure 20 has been removed, and thereby sends a signal to the actuating device 26 which switches the valve structure 28 to an opened condition. Refueling through the fill pipe 14 into tank 12 will permit fuel vapors to vent through first pipe 34, valve structure 28, second pipe 36, and carbon canister 44 before being exhausted to the atmosphere. After refueling is complete, the closure structure 20 is replaced, and the closure structure sensing device 22 sends a signal (e.g., high or low signal) to control unit 24, which in turn sends a signal (e.g., high or low signal) to actuating device 26 to switch the valve structure 28 to a closed condition.

The present invention advantageously utilizes a closure structure sensing device 22, which is conventionally known for sending a signal to the vehicle operator indicating that the closure structure 20 is not properly in place when driving. Thus, components that are already known in motor vehicles can be optimally taken advantage of. In addition, the present invention obviates any need for mechanical valving in a filler pipe or nozzle receiving portion to control the path to the carbon canister 44. In addition, the present invention obviates the need for separate piping from the tank 12 to the nozzle receiving portion 16 and then back to the carbon canister 44. These sorts of conventional arrangement are problematic with respect to packaging and damage during collisions. Moreover, these conventional arrangements are relatively expensive.

Any U.S. Patents or patent applications mentioned hereinabove are hereby incorporated in their entirety into the present application by reference.

It will be thus seen that the objects of the present invention have been fully and effectively accomplished. It will be realized, however, that the foregoing preferred specific embodiment has been shown for the purpose of illustrating the functional and structural principles of the present invention and is subject to change without departure from such principles. Therefore, the present invention includes all modifications encompassed within the spirit and scope of the following claims.

What is claimed is:

1. An on-board refueling vapor recovery system for a motor vehicle, said system comprising:

a fuel tank constructed and arranged to store a quantity of liquid fuel;

a nozzle-receiving portion having a nozzle-receiving opening, said nozzle-receiving portion being fluidly communicated with said fuel tank such that a fuel nozzle can be inserted into said nozzle-receiving opening and supply liquid fuel to said fuel tank;

closure structure constructed and arranged to be moved into closing engagement with said nozzle-receiving portion to thereby close said nozzle-receiving opening, said closure structure being movable out of closing engagement with said nozzle-receiving portion to thereby allow the fuel nozzle to be inserted into said nozzle-receiving opening;

an exhaust passage communicating said fuel tank to an atmosphere outside of the motor vehicle when said exhaust passage is in an opened condition to thereby allow fuel vapor to vent from said fuel tank to the atmosphere;

a filtration device disposed in said exhaust passage and being constructed and arranged to filter environmentally harmful elements from the fuel vapor as the fuel vapor vents from said fuel tank to the atmosphere through said exhaust passage;

a valve disposed in said exhaust passage and movable between a closed position to close said exhaust passage and an opened position to open said exhaust passage;

a closure structure sensing device positioned and configured to transmit electric signals based on whether said closure structure is disposed in closing engagement with said nozzle-receiving portion;

a valve control unit operatively connected with said valve and constructed and arranged to control whether the valve is opened or closed, said valve control unit being responsive to said electrical signal from said closure sensing device and to a signal from the motor vehicle indicating whether the motor vehicle ignition has been activated, said valve control unit opening said valve to communicate said fuel tank with said filtration device to thereby allow the fuel vapor to be filtered and vented from said fuel tank to the atmosphere through said exhaust passage in response to said signal indicating the motor vehicle ignition has not been activated in combination with said electrical signal from closure structure sensing device indicating that said closure structure has been moved out of closing engagement with said nozzle-receiving portion, said valve control unit closing said valve to prevent communication between said fuel tank and said filtration device in response to said signal indicating the motor vehicle ignition has been activated.

2. An on-board vapor recovery system according to claim 1 wherein said valve control unit is constructed and arranged to close said valve and prevent communication between said fuel tank and the filtration device to thereby prevent the fuel vapor from entering said filtration device and venting from said fuel tank through said exhaust passage to the atmosphere when the signal from the motor vehicle indicates that the ignition has not been activated and said electrical signal from said closure structure sensing device indicates that said closure structure has been moved into engagement with said nozzle receiving portion.

3. An on-board refueling vapor recovery system according to claim 1, wherein said valve includes a movable valve element and said control unit is operable to move said movable valve element between (1) an open position wherein the valve permits fuel vapor to be filtered and vented from said fuel tank to the atmosphere through said exhaust passage in response to said signal indicating the motor vehicle ignition has not been activated in combination with said electrical signal indicating that said closure structure has been moved out of closing engagement with said nozzle-receiving portion and (2) a closed position wherein the valve prevents fuel vapor from entering said filtration device and venting from said fuel tank through said exhaust passage to the atmosphere when the signal from the motor vehicle indicates that the ignition has not been activated and said electrical signal from said closure structure sensing device indicates that said closure structure has not been moved into engagement with said nozzle-receiving portion.

4. An on-board refueling vapor recovery system according to claim 3, wherein said exhaust passage comprises a valve actuating device, said valve actuating device being constructed and arranged to move said movable valve element between the respective open and closed positions thereof in response to said signals received from said control unit.

5. An on-board refueling vapor recovery system according to claim 4, wherein said exhaust passage further comprises:

a first pipe having one end communicating with said movable valve element and another end communicating with said fuel tank; and a second pipe having one end communicating with said movable valve element and another end communicating with the atmosphere, said movable valve element sealing said one end of said first pipe when in said closed position thereof.

6. An on-board refueling vapor recovery system according to claim 5, wherein said another end of said first pipe communicating with said fuel tank has a float valve mounted thereon and disposed inside said fuel tank, said float valve being constructed and arranged to seal said another end of said first pipe to thereby prevent the liquid fuel from escaping from said fuel tank into said exhaust passage when the quantity of liquid fuel in said fuel tank has reached a predetermined level.

7. An on-board refueling vapor recovery system according to claim 4, wherein said valve actuating device is a solenoid.

8. An on-board refueling vapor recovery system according to claim 4 wherein said valve actuating device is constructed and arranged to move said movable valve element between the respective open and closed positions thereof in response to electric signals received from said valve control unit.

9. An on-board refueling vapor recovery system according to claim 1, wherein said valve control unit is constructed and arranged to transmit a warning signal to a person operating the motor vehicle in response to said signal indicating the motor vehicle ignition has been activated in combination with said electric signal from said closure structure sensing device indicating that said closure structure has been moved out of closing engagement with said nozzle-receiving portion.

10. An on-board refueling vapor recovery system according to claim 9 wherein said control unit is electrically connected directly with the ignition of the motor vehicle to determine whether the ignition of the motor vehicle has been activated.

11. An on-board refueling vapor recovery system according to claim 9 wherein said warning signal transmitted to the person operating the motor vehicle is a warning light on a dashboard mounted within an interior of the motor vehicle.

12. An on-board refueling vapor recovery system according to claim 7, wherein said valve includes a movable valve element and said control unit is operable to move said movable valve element between (1) an open position wherein the valve permits fuel vapor to be filtered and vented from said fuel tank to the atmosphere through said exhaust passage in response to said signal indicating the motor vehicle ignition has not been activated in combination with said electrical signal indicating that said closure structure has been moved out of closing engagement with said nozzle-receiving portion and (2) a closed position wherein the valve prevents fuel vapor from entering said filtration device and venting from said fuel tank through said exhaust passage to the atmosphere when the signal from the motor vehicle indicates that the ignition has not been activated and said electrical signal from said closure structure sensing device indicates that said closure structure has not been moved into engagement with said nozzle-receiving portion.

13. An on-board refueling vapor recovery system according to claim 12, wherein said exhaust passage comprises a valve actuating device, said valve actuating device being constructed and arranged to move said movable valve element between the respective open and closed positions thereof in response to signals received from said control unit.

14. An on-board refueling vapor recovery system according to claim 13, wherein said exhaust passage further comprises:

a first pipe having one end communicating with said movable valve element and another end communicating with said fuel tank; and a second pipe having one end communicating with said movable valve element and another end communicating with the atmosphere, said movable valve element sealing said one end of said first pipe when in said closed position thereof.

15. An on-board refueling vapor recovery system according to claim 14, wherein said another end of said first pipe communicating with said fuel tank has a float valve mounted thereon and disposed inside said fuel tank, said float valve being constructed and arranged to seal said another end of said first pipe to thereby prevent the liquid fuel from escaping from said fuel tank into said exhaust passage when the quantity of liquid fuel in said fuel tank has reached a predetermined level.

16. An on-board refueling vapor recovery system according to claim 1 wherein said valve control unit is electrically connected directly with the ignition of the motor vehicle to determine whether the ignition of the motor vehicle has been activated.

17. An on-board refueling vapor recovery system according to claim 1, wherein said valve control unit is a microprocessor unit.

18. An on-board refueling vapor recovery system according to claim 1, wherein said filtration device is a carbon filter.

19. An on-board refueling vapor recovery system according to claim 1, wherein said closure structure sensing device electrically detects whether said closure structure is disposed in closing engagement with said nozzle-receiving portion and transmits said electrical signals based upon such detection.

20. An on-board refueling vapor recovery system according to claim 1, wherein said closure structure sensing device electro-mechanically detects whether said closure structure is disposed in closing engagement with said nozzle-receiving portion and transmits said electrical signals based upon such detection.

21. An on-board refueling vapor recovery system according to claim 1, wherein said closure structure sensing device pneumatically detects whether said closure structure is disposed in closing engagement with said nozzle-receiving portion and transmits said electrical signals based upon such detection.

22. An on-board refueling vapor recovery system for a motor vehicle, said system comprising:

a fuel tank constructed and arranged to store a quantity of liquid fuel;

a nozzle-receiving portion having a nozzle-receiving opening, said nozzle-receiving portion being fluidly communicated with said fuel tank such that a fuel nozzle can be inserted into said nozzle-receiving opening and supply liquid fuel to said fuel tank;

closure structure constructed and arranged to be moved into closing engagement with said nozzle-receiving portion to thereby close said nozzle-receiving opening, said closure structure being movable out of closing engagement with said nozzle-receiving portion to thereby allow the fuel nozzle to be inserted into said nozzle-receiving opening;

an exhaust passage communicating said fuel tank to an atmosphere outside of the motor vehicle when said exhaust passage is in an opened condition to thereby allow fuel vapor to vent from said fuel tank to the atmosphere;

a filtration device disposed in said exhaust passage and being constructed and arranged to filter environmentally harmful elements from the fuel vapor as the fuel vapor vents from said fuel tank to the atmosphere through said exhaust passage;

a valve disposed in said exhaust passage and movable between a closed position to close said exhaust passage and an opened position to open said exhaust passage;

a closure structure sensing device positioned and configured to transmit electric signals based on whether said closure structure is disposed in closing engagement with said nozzle-receiving portion;

a valve control unit operatively connected with said valve and constructed and arranged to control whether the valve is opened or closed, said valve control unit being responsive to said electrical signal from said closure sensing device and to a signal from the motor vehicle indicating whether the motor vehicle engine is running, said valve control unit opening said valve to communicate said fuel tank with said filtration device to thereby allow the fuel vapor to be filtered and vented from said fuel tank to the atmosphere through said exhaust passage in response to said signal indicating the motor vehicle engine is not running in combination with said electrical signal from closure structure sensing device indicating that said closure structure has been moved out of closing engagement with said nozzle-receiving portion, said valve control unit closing said valve to prevent communication between said fuel tank and said filtration device in response to said signal indicating the motor vehicle engine is running.

\* \* \* \* \*